(12) United States Patent
Sokurenko et al.

(10) Patent No.: US 6,230,372 B1
(45) Date of Patent: May 15, 2001

(54) PANEL FASTENER AND RETAINER DEVICE

(75) Inventors: William E. Sokurenko, Glen Mills; Christopher J. Pinkow, Boothwyn; Loc B. Tieu, Exton, all of PA (US); William Wiedmann, Kailua, HI (US); Thomas D. Goham, West Chester; Eric D. Hyp, Aspers, both of PA (US)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 09/256,183

(22) Filed: Feb. 24, 1999

Related U.S. Application Data

(63) Continuation-in-part of application No. 09/195,377, filed on Nov. 18, 1998, now abandoned, which is a continuation-in-part of application No. 09/168,407, filed on Oct. 8, 1998, now abandoned, which is a continuation-in-part of application No. 09/046,088, filed on Mar. 23, 1998, now abandoned.

(51) Int. Cl.[7] .................................................. A44B 21/00
(52) U.S. Cl. ..................................... 24/265 CD; 24/115 K
(58) Field of Search ..................................... 410/101, 104, 410/105, 106, 110, 116; 248/503, 222.11, 222.12, 222.51, 225.22, 294.1; 24/115 K, 265 CD, 265 R, 265 AL; 16/126, 127

(56) References Cited

U.S. PATENT DOCUMENTS

| 980,193 | * | 1/1911 | Brenia ..................................... 16/126 |
| 1,407,884 | * | 2/1922 | Ohnstrand .............................. 16/126 |
| 2,701,114 | * | 2/1955 | Donaldson . |
| 3,082,473 | * | 3/1963 | West ....................................... 16/126 |
| 3,158,284 | * | 11/1964 | Henchert et al. ....................... 16/126 |
| 3,963,104 | * | 6/1976 | Lautin .................................... 16/126 |
| 4,297,962 | * | 11/1981 | Johnson, Jr. . |
| 5,461,755 | * | 10/1995 | Hardigg et al. ......................... 16/126 |
| 5,774,948 | * | 7/1998 | Petschke et al. . |

* cited by examiner

Primary Examiner—James R. Brittain
(74) Attorney, Agent, or Firm—Paul & Paul

(57) ABSTRACT

A fastener secures to a first member. The fastener comprises an attachment member and a retaining member connected to the attachment member for rotation. The attachment member has a body and a support. The retaining member is positioned between the body and the support. The support is attached to and moveable relative to the body for regulating frictional resistance between the retaining member and the attachment member.

16 Claims, 13 Drawing Sheets

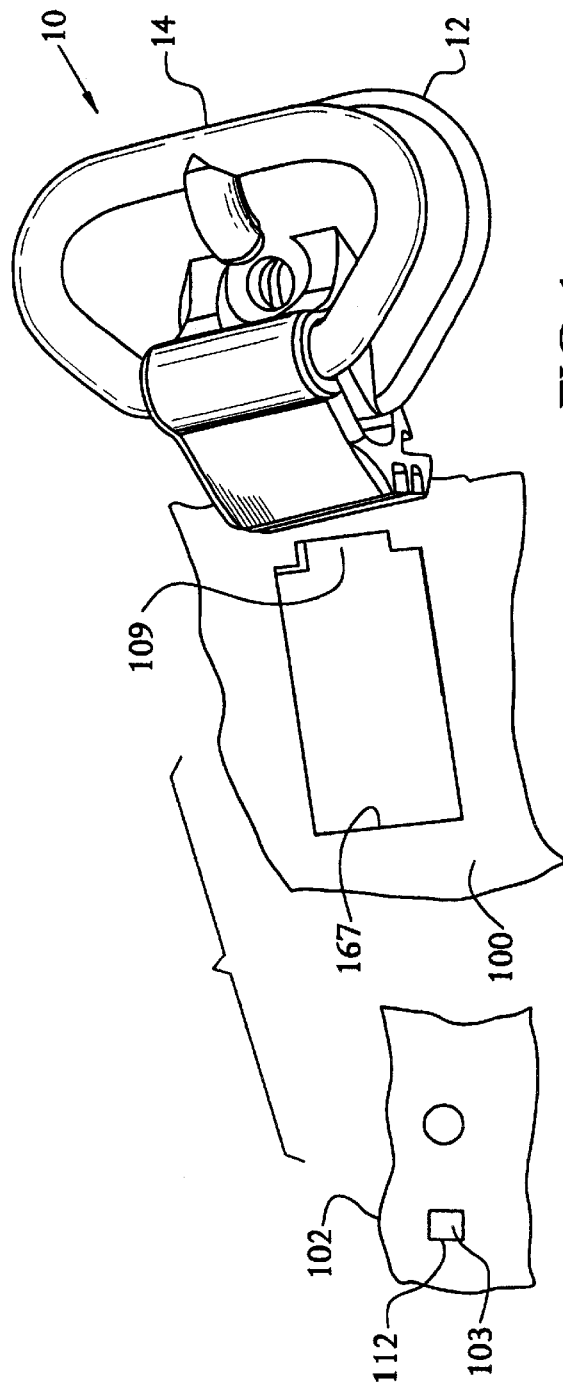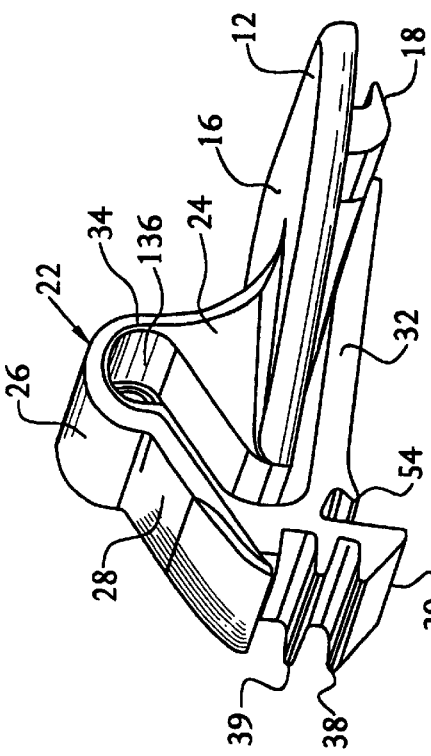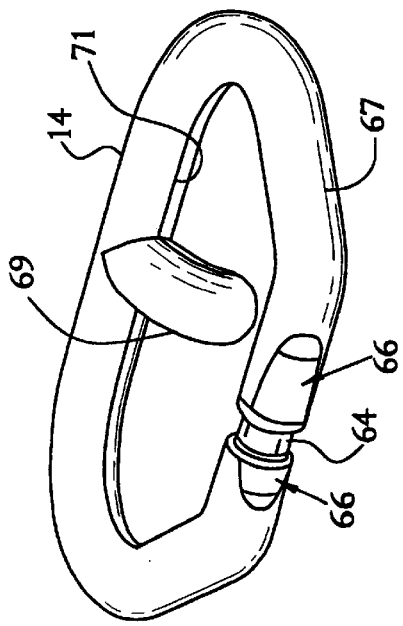

PANEL FASTENER AND RETAINER DEVICE

CROSS REFERENCE TO RELATED APPLICATIONS

This application is a continuation-in-part of U.S. patent application Ser. No. 09/195,377 filed Nov. 18, 1998, now abandoned, which is a continuation-in-part of U.S. patent application Ser. No. 09/168,407 filed Oct. 8, 1998, now abandoned, which is a continuation-in-part of U.S. patent application Ser. No. 09/046,088 filed Mar. 23, 1998 now abandoned.

BACKGROUND OF THE INVENTION

1. Field of the Invention

The present invention relates to fasteners for securing panel members and to retaining devices for permanently or temporarily holding various elements.

2. Brief Description of Prior Art

Various fastening devices are known for securing together panel members. One example of the various applications for which such fasteners are used is for securing molding or trim to a quarter panel of a vehicle. Such fasteners for this purpose typically are in the nature of screws or rivets, however, a drawback with such types of fasteners are that assembly can be difficult and/or time consuming, and also it is difficult if not impossible to remove the fastener after it has been installed, for example, so as to remove the trim from the quarter panel such as for maintenance of the vehicle.

In addition, retaining devices are known which operate to support various elements, one example of which comprises a length of strap material, such as elastic cord typically known as bungee cord and two hook elements secured to the opposing ends. In use, each of the hook ends are attached at different locations to a separate retaining device, such as to an edge of a panel; for example, the edge defined by the door or trunk on a vehicle. One drawback with such types of devices is that there often is no readily accessible portion on a panel member to operate as a retaining device, and which is also strong enough to support the various elements, such as the hook member when under tension by stretching of the flexible cord.

The present invention has been developed in view of the foregoing and to overcome the deficiencies of the prior art.

SUMMARY OF THE INVENTION

The present invention discloses a fastener for securing together panel members as well as a retaining member for securing various elements. While the fastener and retaining member can be provided as separate elements, in a preferred embodiment of the present invention, as will be described herein, a fastener and retaining member is disclosed comprised in a single device. For this purpose, the present invention comprises in one embodiment a bezel having means for attachment to a panel and a retainer connected with the bezel.

In accordance with the present invention, it is an object to provide a fastener for securing together panel members.

It is another object of the present invention to provide a retaining member which can be fastened to a member and in operation secure various elements.

It is another object of the present invention to provide a fastener adapted for securing together panel members, with the fastener including a retaining member for securing various elements.

It is still another object of the present invention to provide a fastener having means for being snapped into a panel member.

It is another object of the present invention to provide a fastener having a plurality of different features which operate to retain two panel members in a fastened position.

It is still another object of the present invention to provide a retaining member capable of being provided in a number of different forms, such as a hoop, and with the retaining member where desired also having the capability of adjustment.

It is still another object of the present invention to provide an adjustable retaining member in which movement of the retaining member is controlled.

Another object is to provide an adjustable retaining member, which, when adjusted, will retain the adjusted position.

Still another object of the present invention is to provide an adjustable retaining member and which can be moved into one or more detent positions.

Still another object is to provide a fastener capable of securing together panel members as well as accommodating disassembly of the panel members without damage to either the panel members or the fastener itself.

These and other objects of the present invention will become more readily apparent when taken into consideration with the following description and attached drawings.

BRIEF DESCRIPTION OF THE DRAWINGS

FIG. 1 is a perspective view of an embodiment of a fastener in accordance with the present invention.

FIG. 2 is a perspective view of a retaining member of FIG. 1.

FIG. 3 is a perspective view of an attachment member of FIG. 1.

DETAILED DESCRIPTION OF THE PREFERRED EMBODIMENTS

Figure 3A:
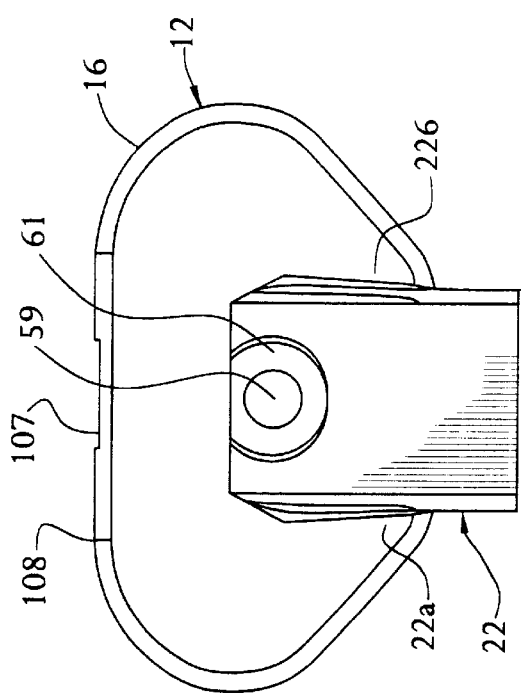
FIG. 3a is a top plan view of an attachment member of FIG. 1.

Referring now to the drawings in detail, wherein like reference numerals indicate like elements through the several views, there is shown in FIGS. 1–6 an embodiment of a fastener in accordance with the present invention. As illustrated in FIG. 1, the fastener 10 in accordance with the present embodiment comprises an attachment member 12 and a retaining member 14, which will be described in more detail below.

Figure 4:
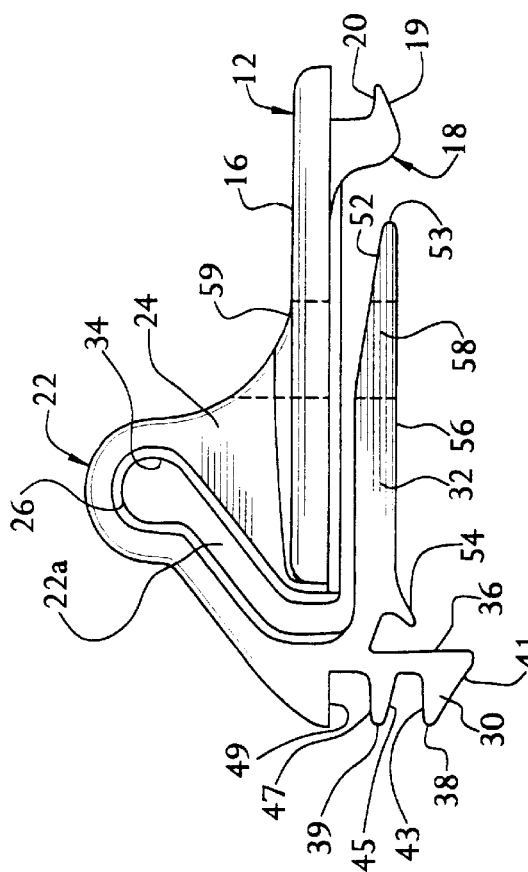
FIG. 4 is a side elevational view of the attachment member of FIG. 3.

The attachment member 12 in accordance with the present embodiment is best illustrated in FIGS. 3, 3a and 4. The attachment member 12 comprises a bezel having a body 16 generally in the shape of a triangular with radiused corners in the present embodiment. The body 16 includes a bottom or lower surface extending along a first axis and at least one projection extending from its lower surface comprising the projection 18. The projection 18 in this embodiment is generally rectangular in shape and includes a ramped camming surface 19 and a locking surface 20 proximate its distal end. The attachment member 12 also includes a support 22 attached to the body 16, which in the present embodiment the support 22 is attached to a portion of the front and top surfaces of the body 16. The support 22 in this embodiment comprises, as portions thereon a first portion 24 generally triangular in cross-section attached to the body 16, a curved second portion 26, a generally planar third portion 28 at spaced separation from and opposite the first portion 24, a fourth portion 30 defining a mounting element and a fifth portion 32 defining a flange at spaced separation from and substantially parallel the bottom surface of the body 16. The configuration of the various portions of the support 22 define an opening 22a at the center. In this embodiment, the support 22 also includes a tongue comprising a rib rail 34 of defined length extending along the inner surface 136. In this embodiment, the rib rail 34 is positioned slightly off center closer to the side 22a than to the side 22b of the support 22 as shown in FIG. 3a. In addition, in this embodiment, the rib rail 34 as best shown in FIG. 4 is attached with each of the portions 24, 26 and 28, the purpose of which will be described below. The mounting element 30 in this embodiment extends along a second axis transverse and preferably substantially perpendicular the first axis defined by the bottom surface of the body 16. The mounting element 30 comprises a generally rectangular shaped wall 36 and at least one, and in this embodiment, two projections 38 and 39 connected with the wall 36. In the present embodiment, the projection 38 is positioned at the distal end of the wall 36 and includes a ramped camming surface 41 and a locking surface 43. The projection 39 in this embodiment is at spaced separation from the projection 38 and defines a camming surface 45 and a locking surface 47. In addition, in this embodiment, a flange comprising a substantially planar locking surface 49 is defined by the connection of the third portion 28 with the wall 36 and is generally parallel the projections 38 and 39. The flange 32 in this embodiment is generally rectangular in configuration attached at a first end to the wall 36 of the portion 30 and includes a generally tapered upper surface 52 proximate its second end. In this embodiment, the flange 32 includes a lip 54 generally triangular in shape in cross-section and attached to the bottom 56 of the flange 32 proximate the first end thereof. In addition, the flange 32 includes an aperture 58 therethrough shown in dotted lines which in this embodiment is substantially annular in configuration. In addition, the attachment member 12 also includes a through hole 59 extending through a portion of the support 22 and the body 16 and which is generally annular in configuration in this embodiment and aligned with the aperture 58 through the flange 32, as shown in the top plan view of FIG. 3a and in dotted lines in the side elevational view of FIG. 4. In addition, in this embodiment a generally annular recess 61 is provided within the support 22 adjacent to the through hole 59, as shown in FIG. 3a.

The retaining member 14 in this embodiment is best illustrated in the isolated perspective view of FIG. 2. The retaining member 14 in this embodiment is in the form of a solid hoop, although it should be understood that other configurations for the retaining member can also be provided for the same purpose. Hoop 14 in this embodiment is generally triangular in shape with radiused corners, similar in configuration to the body 16 of the attachment member 12. The retaining member 14 in this embodiment further includes a groove 64 extending at least partially around and preferably entirely around a portion of its circumference. In addition, in this embodiment, the retaining member 14 also preferably includes at least one and preferably two detent cams 66 extending from an outer surface 67 and positioned adjacent to the groove 64, the purpose of which will be described below. In addition, the retaining member 14 in this embodiment includes a tongue comprising a projection 69 generally elongated and slightly curved in this embodiment attached to an inner surface 71 generally opposite the groove 64 in this embodiment.

The assembly of the attachment member 12 and retaining member 14 will now be described. In this embodiment, preferably the retaining member 14 is inserted onto the distal end 53 of the flange 32 and then moved into the position shown in FIG. 1, within the curved second portion 26 of the support 22. Although not shown, in this embodiment preferably the rib rail 34 is positioned within the groove 64 of the retaining member 14 when assembled in the position shown in FIG. 1. In addition, assembly of the retaining member 14 and attachment member 12 in this embodiment is facilitated by the flexibility of the support 22. In particular, the flexibility of the support 22 is provided by a living hinge connection of the flange 32 to the portion 30, and living hinge connection of the first and third portions 24 and 28 by the curved second portion 26. In this embodiment, preferably the attachment member 12 and retaining member 14 are each of one-piece in configuration, although as should be understood, the retaining member 14 and attachment member 12 can each be comprised of separate elements where desired. In this embodiment, preferably the attachment member 12 and retaining member 14 are comprised of molded plastic, although any other suitable materials and/or manufacturing processes can also be used for the same purpose.

Figure 5:
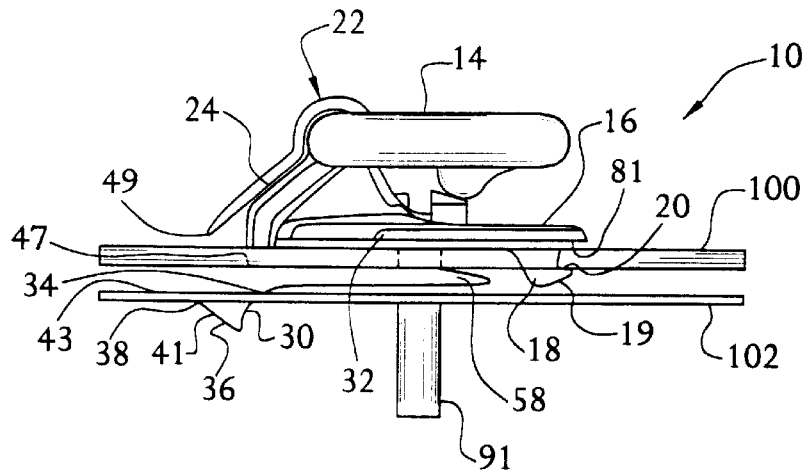
FIG. 5 is a side elevational view of the fastener of FIG. 1 illustrating a fastened position securing two panel members.

The operation of the fastener 10 of the present embodiment for fastening two panel members 100 and 102 illustrated in FIG. 5 will now be described. In this embodiment, means are provided for connecting the fastener 10 to the panel member 100. As best illustrated in FIG. 1, for mounting of the fastener 10, preferably the first panel member 100 is provided having an aperture therethrough, which in this embodiment is comprised of a generally rectangular larger shaped first portion attached with a smaller generally rectangular shaped second portion. With reference to FIGS. 1 and 5, on mounting of the fastener 10 within the first panel member 100, the front portion of the fastener 10 is first inserted into the aperture so that the edge 167 of the panel member 100 is positioned in the space between and preferably in engagement with the locking surface 49 of the third portion 28 and locking surface 47 of the projection 39 of the fourth portion 30. The back end of the fastener 10 is then inserted into the aperture so that the ramped camming surface 19 of the projection 18 comes into engagement with the edge 109 of the first panel member 100 adjacent to the aperture. Thereafter, continued movement of the back end of the fastener 10 into the aperture of the first panel member 100 will move the body 16 in a direction of the edge 167 due to the flexible living hinge connection provided by the support 22, in particular the curved second portion 26 of the support 22. The fastener 10 is then snapped into the position shown in FIG. 5 when the camming surface 19 is moved past the edge 109 of the first panel member 100, and preferably the support 22 is slightly compressed from its position prior to mounting. As shown in FIG. 5, when the fastener 10 is in the mounted position, the panel 100 is positioned between the locking surface 20 of the projection 18 and the flange portion 81 comprised of a portion of the bottom surface of body 16. In this embodiment, preferably the distance of the space between flange portion 49 and locking surface 47 defined by the third portion 29 and projection 30 of the support 22, and between locking surface 20 and flange portion 81 of the body 16 and projection 18, respectively, substantially correspond to a width of the first panel member 100. In addition, preferably the bottom surface of the body 16 is at least adjacent and preferably in engagement with the outer surface of the first panel member 100. In this embodiment, the amount of bending of the support 22 is regulated by the lip 54, which on excessive amount of bending, the lip 54 will engage the wall 36 of the portion 30.

The fastener 10 after being mounted in the first panel member 100 can then be secured to the second panel member 102 at any desired time. In this embodiment, for mounting to the second panel member 102, preferably the retaining member 14 is adjusted by being pivoted in an upward direction from that shown in FIG. 5; for example, in FIG. 6 the retaining member 14 is shown adjusted 90° from the position shown in FIG. 5, although it should be understood that the retaining member 14 can be raised to any desired position. A mounting element such as a threaded bolt 91 shown in FIG. 5 can then be inserted into the through holes 58 and 59 of the fastener 10 and then received into a threaded aperture through the second panel member 102. The bolt 91 preferably has a tool engaging recess provided at its distal end, which is slotted in the present embodiment to receive a slotted screwdriver. Although not shown, for mounting to the second panel member 102, the bolt 91 is rotated by the screwdriver and moved in the direction of the second panel member 102. In this embodiment, preferably the second panel member 102 is provided with an aperture therethrough, such as the aperture 103 illustrated in FIG. 1, in order to accommodate mounting by the fastener member 10. In particular, as the bolt 91 is rotated, the fastener member 10 is also moved in the direction of the second panel member 102 and the camming surface 41 of the projection 38 initially comes into engagement with the edge 112 of the aperture 103. Continued movement of the fastener 10 results with slight flexing of the portion 30 until the fastener 10 is snapped into the position shown in FIG. 5, which allows the portion 30 to move back toward its original position, and the locking surface 43 of the projection 38 comes into engagement with the lower surface of the second panel member 102. In this embodiment, when the fastener 10 is in its mounted position, the lip 54 of the flange 32 is positioned adjacent to the upper surface of the second panel member 102.

The fastener member 10 can be used with a variety of types of first and second panel members 100 and 102 and made from any type of material. One example of the application for the fastener 10 is to secure a piece of trim or molding as the first panel member 100 to a portion of the body of a vehicle as the second panel member 102. For this application, the composition of the trim or molding is typically plastic and the portion of the vehicle to which the molding or trim is attached is typically of sheet metal, such as a rear quarter panel or a mounting bracket secured to the vehicle.

In accordance with the present embodiment, after the fastener 10 has been mounted into the first and second panel members 100 and 102, the retaining member 14 can be used to support various accessories, such as a bungee cord described earlier or a telescoping rod, to name a few. For example, one or a plurality of fastening members 10 can be utilized to facilitate attachment of the various accessories. For instance, using the application with a motor vehicle described above as an example, one or more of the fastening members 10 can be installed to each of one rear quarter panel and then the opposite rear quarter panel to accommodate attachment of the various accessories between the respective fasteners 10. As indicated above, the retaining member 14 in the present embodiment is in the shape of a hoop, although other suitable configurations of the retaining member 14 can also be utilized for the same purpose. In operation, the retaining member 14 is capable of being rotated from the position illustrated in FIG. 5 to any desired position, which is described in more detail below.

In the present embodiment, the attachment between the retaining member 14 and attachment member 12 is such that the support 22 provides frictional torque resistance or drag on the retaining member 14. This drag feature operates to hold the position of the retaining member 14 when adjusted into a desired position. In the present embodiment, the frictional resistance is provided through 180° of rotation of the retaining member 14, although any other desired range can also be used. The amount of frictional resistance provided by the support 22 is dependent on the size of the opening 22a. In addition, in this embodiment, the relationship between the cams 66 on the retaining member 14 and the support 22 of the attachment member 12 operates as a detent for the retaining member 14 when moved into a desired position. For example, in the present embodiment, the cams 66 operate as a detent when the retaining member 14 is moved 90° from the position in FIG. 5 to the position shown in FIG. 6, when moved into the opening 22a defined by the support 22. However, as should be understood, the cams 66 can be provided at any desired location on the retaining member 14 in order to accommodate a detent engagement at any desired rotational position. In this embodiment, either one or both of the drag features and detent features can be provided where desired.

In the present embodiment, means are also included for dismounting of the first and second panel members 100 and 102, and/or for removal of the fastener 10 from its mounted position within the first panel member 100. For this purpose, the body 16 of the attachment member 12 is provided with a slot 107 in the present embodiment positioned within its rear wall 108 as illustrated in FIG. 3a. Although not shown, for dismounting, a tool is inserted into the slot 107, such as a slotted screwdriver, in order to move the body 16 by compression of the living spring connection of the support 22, so as to clear the position of the projection 18 from engagement with the first panel member 100. In this manner, the rear wall 108 of the body 16 can be raised away from the first panel member 100, with one or both of the projections 38 and 39 of the portion 30 then being moved out of engagement with the respective second panel member 102 and first panel member 100 for disassembly. Following disassembly, the fastener 10 can then be mounted in the same manner as above.

Figure 7:
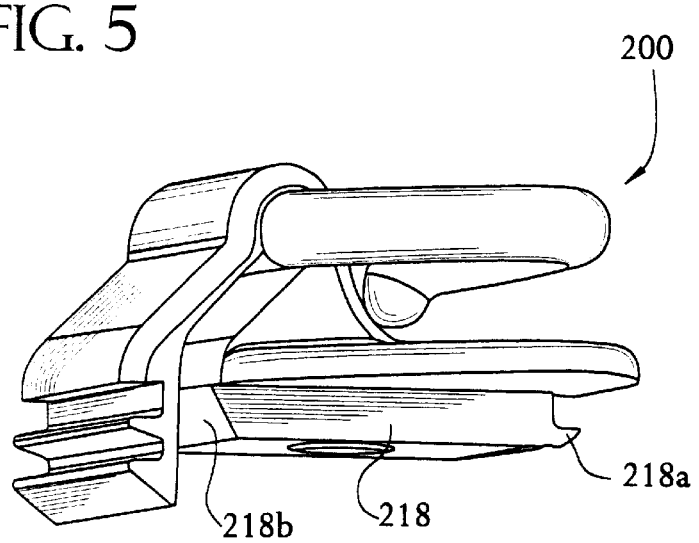
FIG. 7 is perspective view of a fastener in accordance with another embodiment of the present invention.
Figure 6:
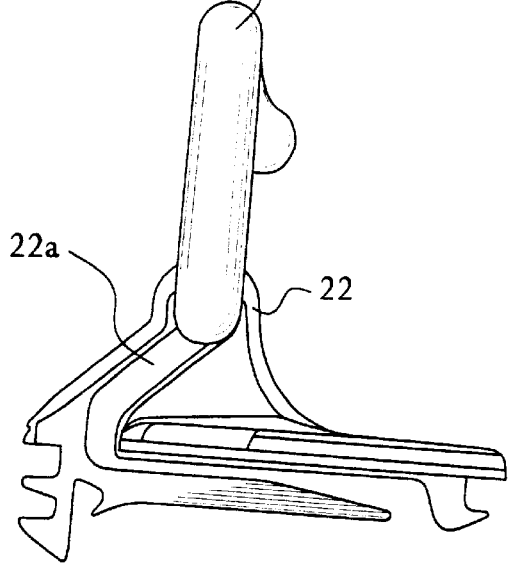
FIG. 6 is a side elevational view of the fastener of FIG. 1 illustrating an adjusted position of the retaining member.
Figure 8:
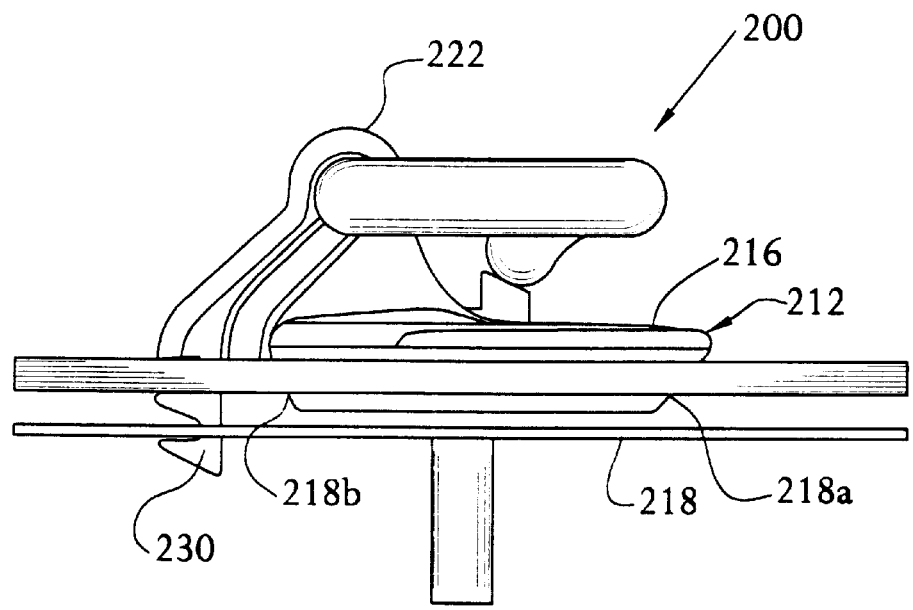
FIG. 8 is a side elevational view of the fastener of FIG. 7 illustrated in a position securing together two panel members.
Figure 9:
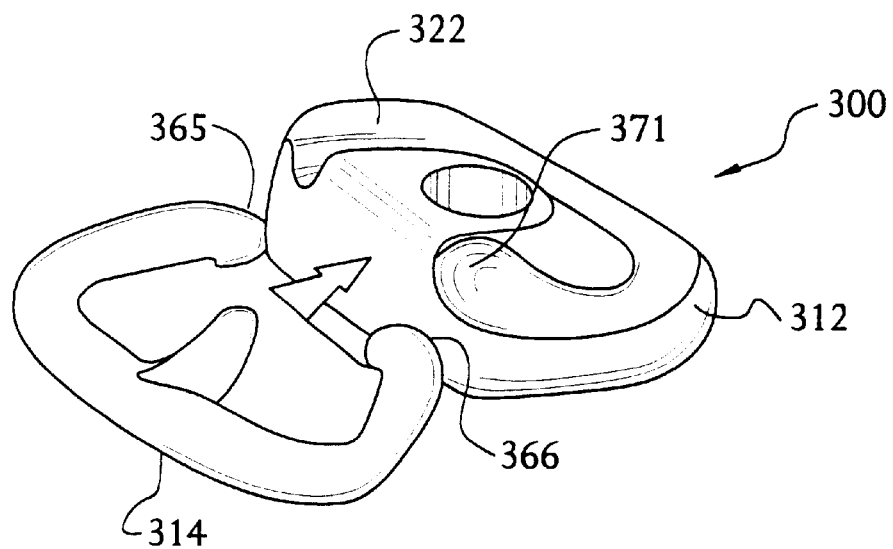
FIG. 9 is an perspective view of a fastener in accordance with another embodiment of the present embodiment.
Figure 10:
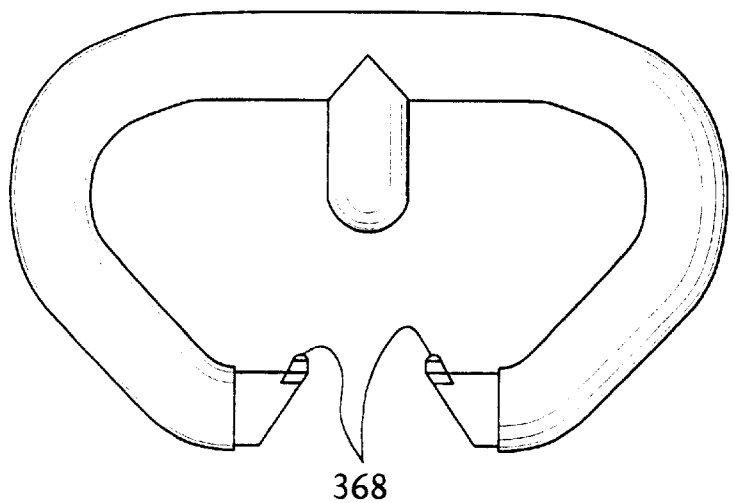
FIG. 10 is a top plan view of the retaining member of FIG. 9.
Figure 12:
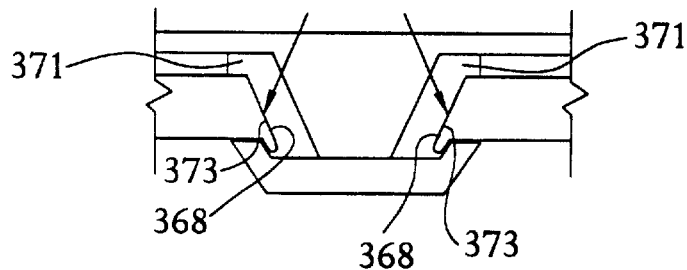
FIG. 12 is a partially fragmentary sectional view taken along the line 12—12 of FIG. 11.
Figure 11:
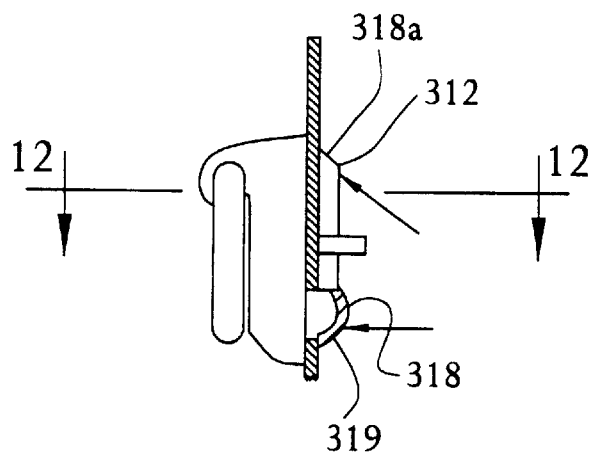
FIG. 11 is a side elevational view of the fastener of FIG. 9 shown assembled and illustrated in a mounted position.
Figure 13:
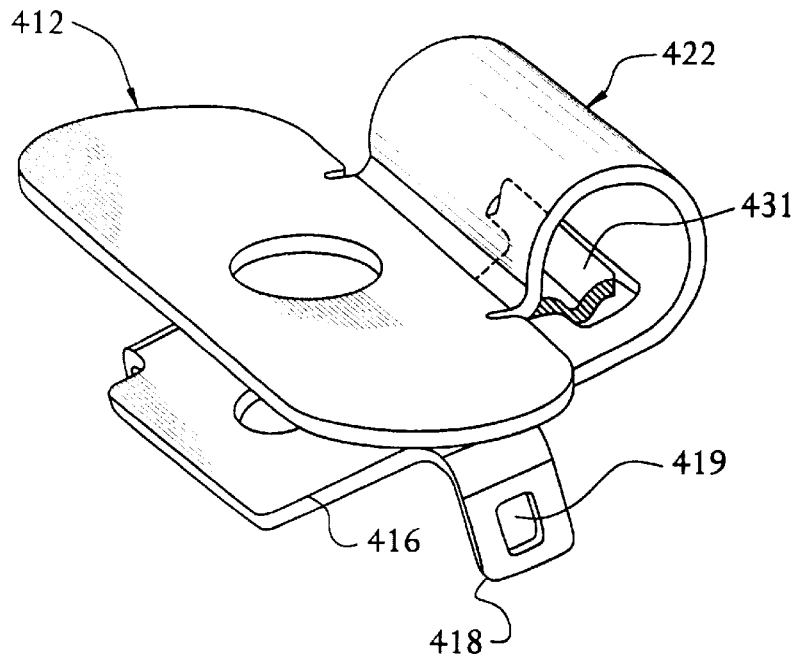
FIG. 13 is a perspective view of an attachment member in accordance with another embodiment of the present invention.
Figure 14:
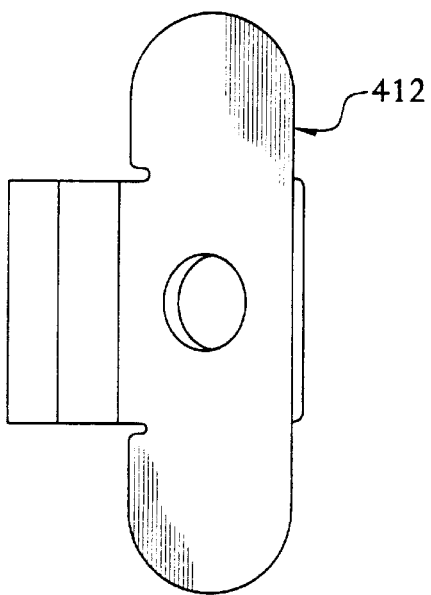
FIG. 14 is a top plan view of the attachment member of FIG. 13.
Figure 15:
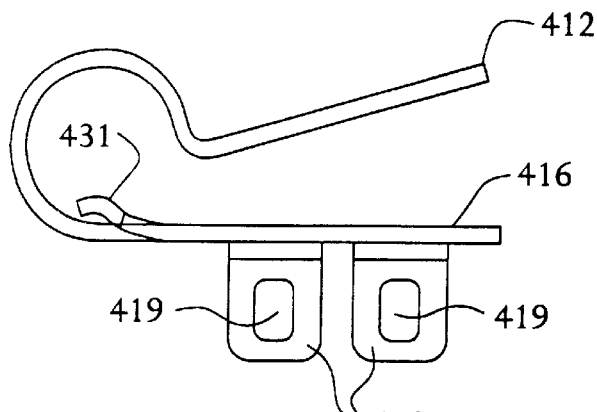
FIG. 15 is a side elevational view of the attachment member of FIG. 13.
Figure 16:
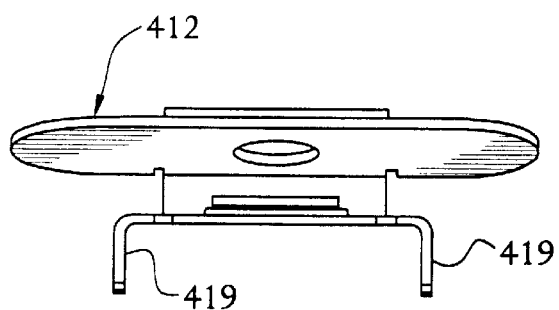
FIG. 16 is a front elevational view of the attachment member of FIG. 13.

In FIGS. 7 and 8 is shown another embodiment of the fastener in accordance with the present invention. For the sake of brevity, only the portions of the present embodiment which differ from the fastener 10 will be described in detail herein. The fastener 200 illustrated in FIGS. 7 and 8 differs from the fastener 10 in the configuration of the attachment member 212. In particular, in this embodiment, the support 222 does not incorporate the feature of the flange 32 of the fastener 10. In addition, the fastener 200 includes a projection 218 which is generally rectangular in configuration extending from the bottom surface of the body 216. Projection 218 in this embodiment includes a projection 218a at its rear end, which operates as the projection 18 of the fastener 10, and an inwardly ramped forward edge 218b, which operates as the lip 54 on the flange 32 of the fastener 10 to limit deflection of the portion 230. The remaining components, assembly and operation are similar to that illustrated with respect to the fastener 10.

In FIGS. 9–12 is illustrated another embodiment of the fastener in accordance with the present invention. Pursuant to that described with respect to the fastener 200, the present embodiment will be described with reference to the fastener 10 for the sake of brevity. The fastener 300 in the present embodiment differs from the fastener 10 in the manner of connection of the retaining member to the attachment member and in the configuration of the support of the attachment member. Specifically, as illustrated in the exploded perspective view of FIG. 9, the retaining member 314 is a split hoop and includes two attachment legs 365 and 366. In this embodiment, each of the legs 365 and 366 include a projection 368 as shown in the isolated view of FIG. 10. In addition, in this embodiment, the support 322 is defined by opposing cavities 371 within the attachment member 12 and which terminate by a lip 373 as shown in the fragmentary sectional view of FIG. 12. Mounting of the retaining member 314 is accomplished by inserting of the legs 365 and 366 into the opposing cavities 371 in order that the projections 368 snap into place so as to be retained in position by the lip 373. Although not shown, the drag and detent features illustrated in the fastener 10 can also be provided in the fastener 300 by the engagement between the legs 365 and 366 within the openings 371 in the attachment member 312. In addition, in the present embodiment, the attachment member 312 includes a projection 318 similar to the projection 218 of the fastener 200 and includes a projection 318a at its back end, however, a difference is the configuration of the front end of the projection 318. In the present embodiment, the projection 318 includes at its front end the means for attachment to the respective panel members. In this embodiment, a leg 319 is attached with the projection 318. Leg 319 can be of any desired configuration, which is generally rectangular in the present embodiment and slightly curved in cross-section. In operation, the resiliency of the leg 319 accommodates mounting and dismounting of the fastener 300 relative to first and second panel members.

In FIGS. 13–24 is illustrated another embodiment of the fastener in accordance with the present invention. For the sake of brevity, the present embodiment will be described with reference to the fastener 10 where that is possible. As illustrated in FIGS. 13–16, the fastener of the present embodiment includes an attachment member 412, which is preferably a metal stamping. The attachment member 412 includes a body 416, and at least one and in this embodiment two projections 418 extending from its bottom surface. The projections 418 in this embodiment are each generally rectangular in configuration and include a window 419 extending therethrough and which is generally rectangular in configuration in the present embodiment. In addition, in the present embodiment, preferably the two projections 418 extend from opposite sides of the body 416 and are offset from one another as best illustrated in the side elevational view of FIG. 15. The attachment member 412 of the present embodiment also includes a support 422 and which includes a detent 431 which in the present embodiment comprises a living spring attached at one end to the bottom portion of the body 416. The detent 431 in operation is generally flexible in order to adjust drag and detent feel relative to the retaining member, which will be described in more detail herein. The remaining elements are similar to that with respect to the fastener 10.

Figure 17:
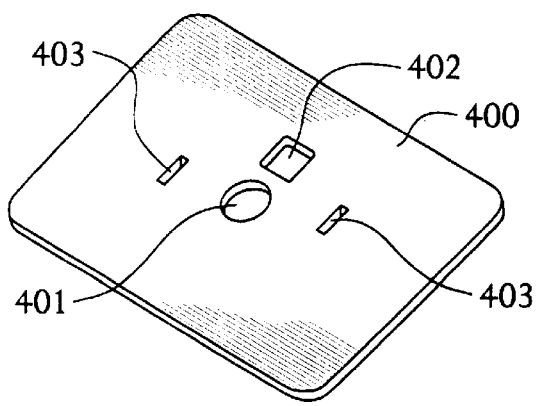
FIG. 17 is a perspective view of a panel member adapted for mounting of the attachment member of FIG. 13.
Figure 18:
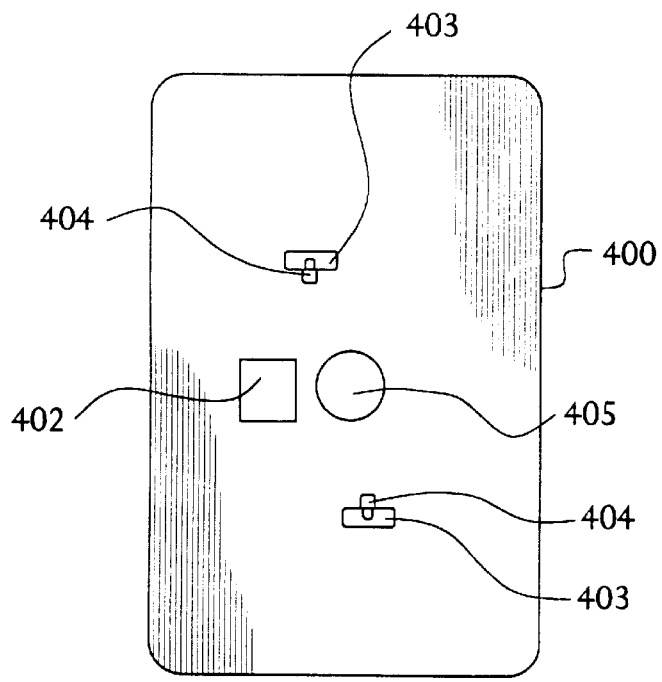
FIG. 18 is a top plan view of the panel member of FIG. 17.
Figure 19:
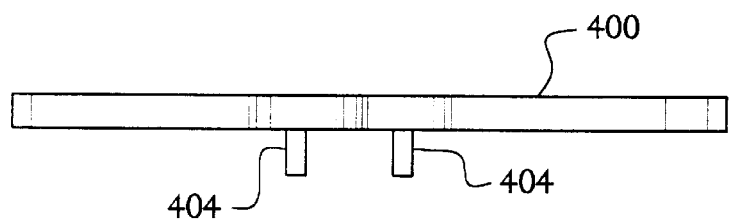
FIG. 19 is a side elevational view of the panel member of FIG. 17.
Figure 20:
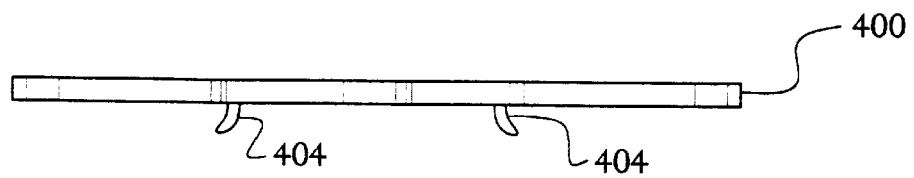
FIG. 20 is a front elevational view of the panel member of FIG. 17.
Figure 21:
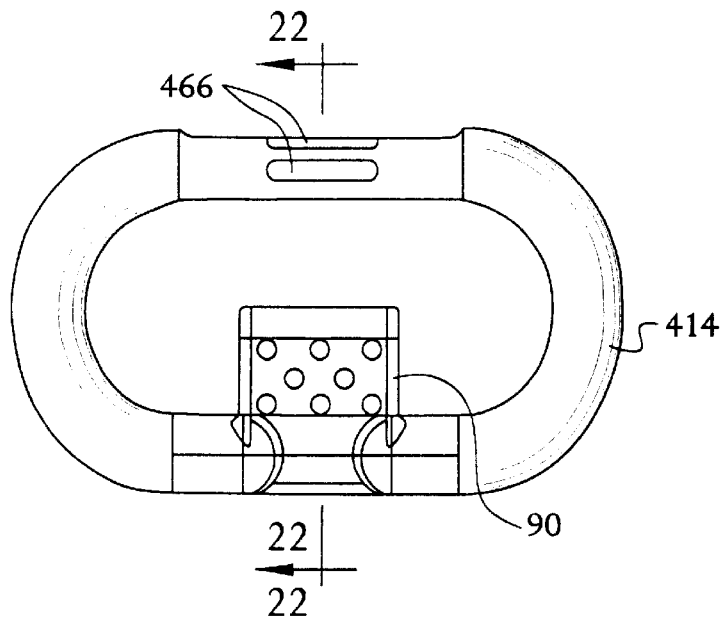
FIG. 21 is a top plan view of a retaining member in accordance with another embodiment of the present invention.
Figure 22:
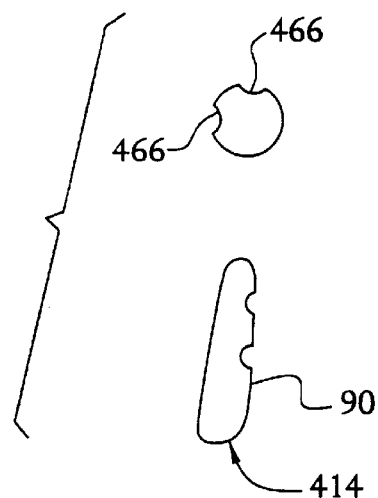
FIG. 22 is a right side sectional view of the retaining member of FIG. 21 taken along the line 22—22 of FIG. 21.
Figure 23:
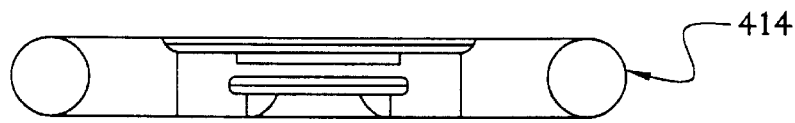
FIG. 23 is a front elevational view of the retaining member of FIG. 21.
Figure 24:
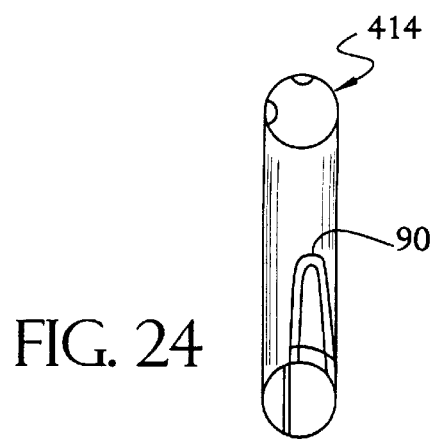
FIG. 24 is a left side elevational view of the retaining member of FIG. 21.

In FIGS. 17–19 is illustrated a panel member prepared for mounting of the attachment member 412 of the present embodiment. In this embodiment, the panel member 400 includes a bolt through hole 401 generally circular in shape, a clearance hole 402 generally square in shape for providing clearance for the detent 431 of the attachment member 412 and a pair of opposing through holes 403 each generally rectangular in shape for receiving the projection 418 of the attachment member 412. In addition, as best illustrated in the front elevational view of FIG. 20, the panel member 400 also includes snap-in legs 404 positioned adjacent the through holes 403 and which operate to snap into the windows 419 of the projections 418 to retain the attachment member 412 when mounting.

FIGS. 21–24 illustrate a retaining member in accordance with another embodiment of the present invention. The retaining member 414 in the present embodiment is preferably an aluminum die cast tube design. In addition, in the present embodiment, the retaining member 414 also includes at least one and in the present embodiment two detent depressions 466 which come into engagement with the detents 431 of the attachment member 412 in operation. In addition, in the present embodiment, the retaining member 414 also includes a grip 490 which in the present embodiment is generally square in shape and positioned on the hoop opposite the detent depressions 466. In the present embodiment, the grip 90 is included with a series of depressions each generally circular in shape within one or both the upper and lower surfaces, although as should be understood, other shapes can also be utilized such as tubular in nature and extending on the surface of the grip 90 generally parallel the longitudinal axis of the detent depressions 466.

Figure 25:
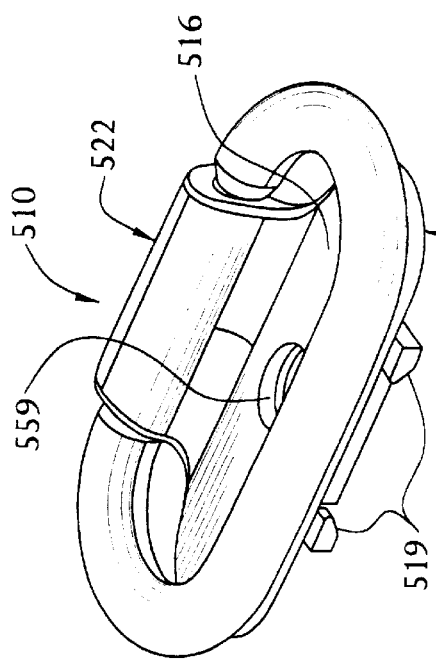
FIG. 25 is a perspective view of a fastener in accordance with another embodiment of the present invention.
Figure 26:
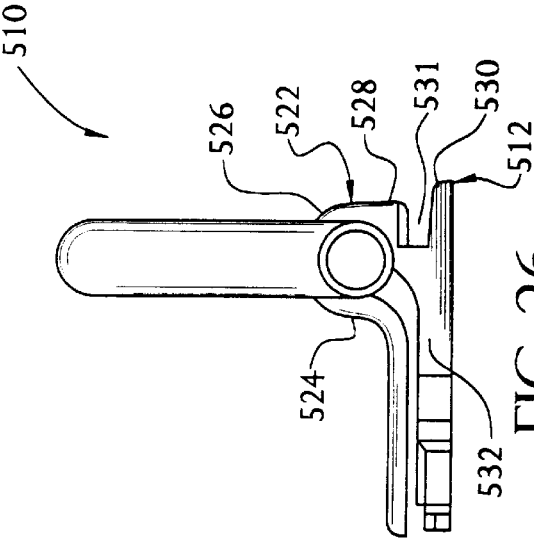
FIG. 26 is a right side elevational view of the fastener of FIG. 25 and illustrating a retaining member in a position approximately 90° from a position of the retaining member illustrated in FIG. 25.
Figure 27:
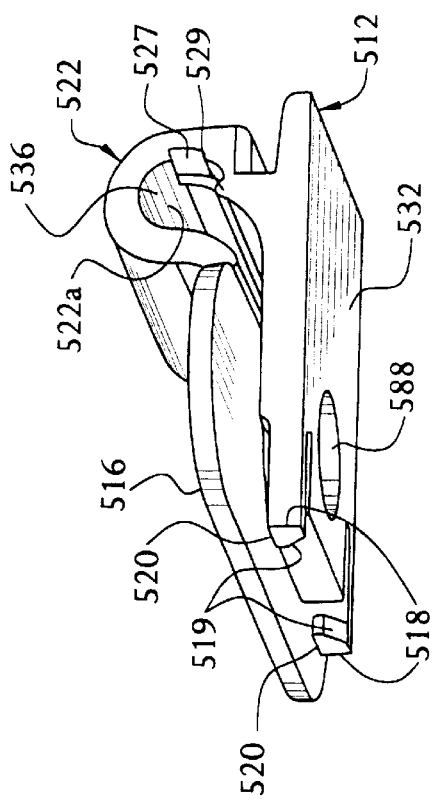
FIG. 27 is a perspective view of an attachment member of FIG. 25.

In FIGS. 25–30 is illustrated another embodiment of a fastener in accordance with the present invention. For the sake of brevity, the present embodiment will be described with reference to the fastener 10 where possible. As illustrated, the fastener 510 of the present embodiment includes an attachment member 512, which is preferably comprised of plastic although any other suitable materials can also be utilized. The attachment member 512 comprises a bezel having a body 516 generally oval in shape and a through hole 559 positioned approximately at its center. The attachment member 512 also includes a support 522 attached to the body 516, which in the present embodiment the support 522 is attached to a portion of the front end surface of the body 516. The support 522 in the present embodiment comprises, as portions thereof, a first portion 524 attached to the body 516, a curved second portion 526, a third portion 528 generally planar and at spaced separation from and opposing the first portion 524, a fourth portion 530 defining a mounting element and a fifth portion 532 defining a flange at spaced separation from and generally parallel the body 516. The configuration of the various portions of the support 522 in the present embodiment define an opening 522a at its center. The support 522 can also include at least one channel 527 provided within its inner surface 536, the purpose of which will be described below. In the present embodiment, a pair of channels 527 are provided within the inner surface 536 which are positioned on opposite sides and substantially aligned with one another (one of the channels 527 is visible in FIG. 27). In the present embodiment, each of the channels 527 extend at approximate 45° intervals and include detent bumps 529 at its terminating ends, which will be described in more detail below. The mounting element 530 in the present embodiment is a projection generally rectangular in shape and defines a gap 531 between the mounting element 530 and the third portion 528, as is illustrated in FIG. 26. The flange 532 in the present embodiment is generally rectangular in configuration and includes a through hole 558 extending therethrough proximate it's back end distal the mounting element 530. In addition, preferably the flange 532 also includes at least one, and more preferably, two projections 518 each generally flexible and rectangular in shape attached at one end to opposing sides of the flange 532 and having ramped camming surfaces 519 and locking services 520 at terminating ends, as is illustrated in FIG. 27.

Figure 28:
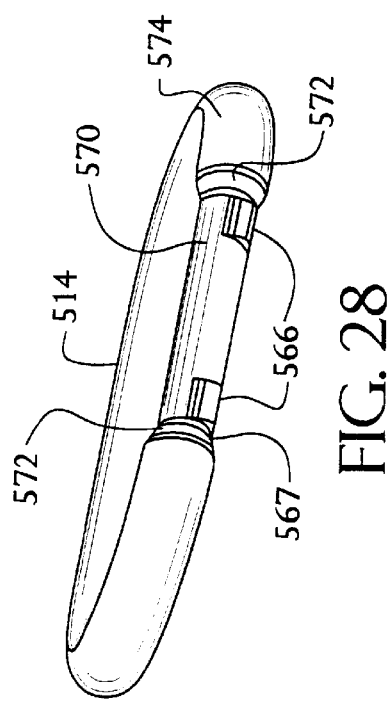
FIG. 28 is a perspective view of the retaining member of FIG. 25.

The retaining member 514 in the present embodiment is best illustrated in the isolated perspective view of FIG. 28. The retaining member 514 of the present embodiment is in the form of a solid hoop, although as should be understood, other configurations can also be provided for the same purpose. The retaining member 514 in the present embodiment is generally oval in configuration substantially corresponding in shape to the configuration of the body 516. The retaining member 514 in the present embodiment defines a first portion 570 having a first diameter, which is generally constant in the present embodiment. In addition, the retaining member 514 can also include one or more detent cams, and in the present embodiment two detent cams 566 are provided attached with the first portion 570 at opposing ends and with each of the detent cams 566 being generally aligned with one another. In this embodiment, the retaining member 514 also includes a tapered shoulder 572 at opposite ends of the first portion 570, and with each of the tapered shoulders 572 terminating by a second portion 574 of a diameter larger than that of the first portion 570.

The assembly of the attachment member 512 and the retaining member 514 will now be described. In this embodiment, the retaining member 514 is inserted into the gap between the body 516 and the flange 532 and then moved into the position shown in FIGS. 25 and 26, with the first portion 570 of the retaining member 514 being positioned within the opening 522a of the support 522. In addition, preferably the retaining member 514 is assembled so that the detent cams 566 are positioned within the channels 527 of the support 522. As discussed with respect to the fastener 10, the attachment member 512 and retaining member 514 are each preferably of one-piece in configuration, but these portions could each also be comprised of separate elements where desired. Also, the assembly of the retaining member 514 relative to the attachment member 512 in this embodiment is facilitated by the flexibility of the support 522.

Figure 30:
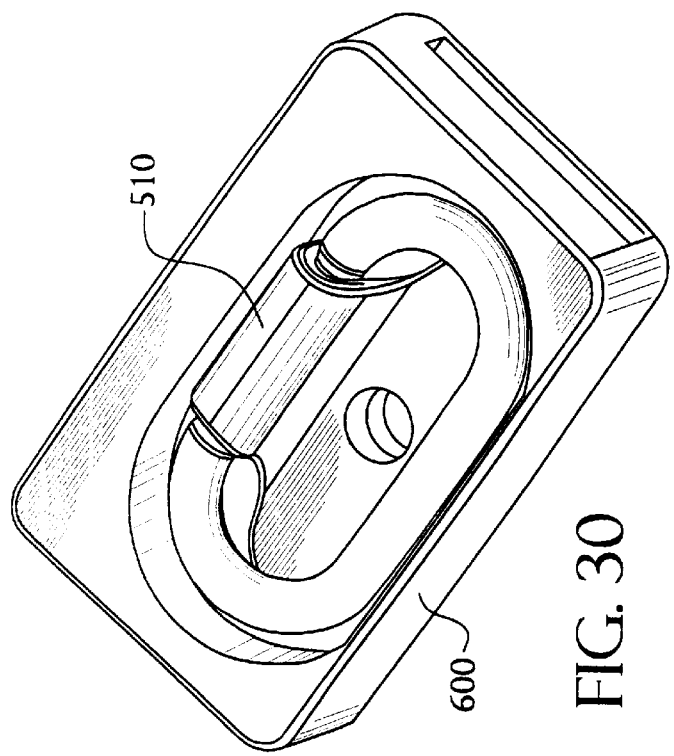
FIG. 30 is a perspective view of the fastener of FIG. 25 shown in a mounted position relative to the panel members shown in FIG. 29.
Figure 29:
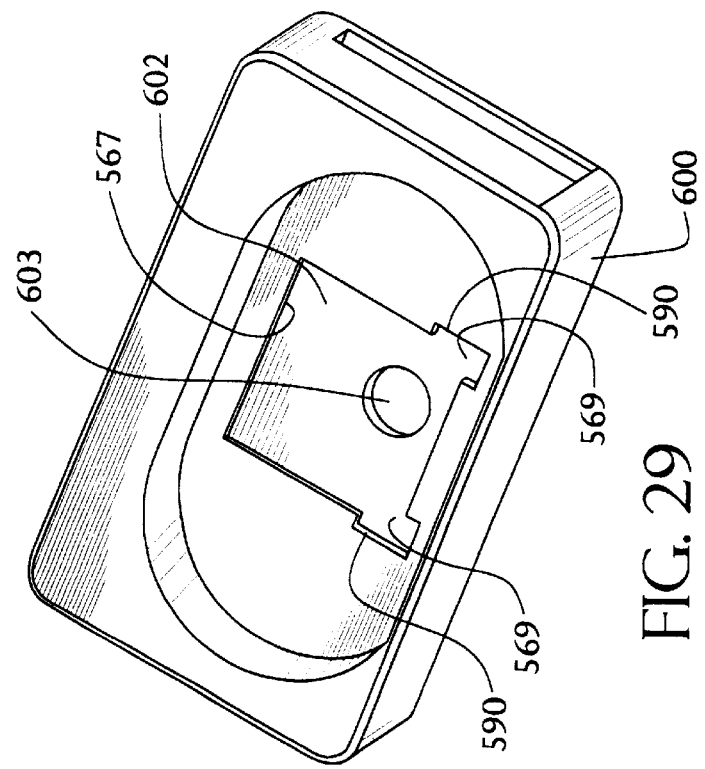
FIG. 29 is a perspective view of first and second panel members adapted for the fastener of FIG. 25.

The assembly of the fastener 510 of the present embodiment within panel member 600 and 602 illustrated in FIGS. 29 and 30 will now be described. As illustrated in FIG. 29, preferably the panel member 600 is provided having an aperture therethrough generally square in shape and with additional smaller rectangular shaped openings 569 at adjacent corners. With reference to FIGS. 26 and 29, on mounting of the fastener 510 within the panel member 600, the front portion of the fastener 510 is first inserted into the aperture so that the edge 567 of the panel member 600 is positioned in the space 531 between the portions 528 and 530, and preferably the edge 567 is in engagement with each of the portions 528 and 530. The back end of the fastener 510 is then inserted into the aperture so that the ramped camming surfaces 519 of the projections 518 come into engagement with the edges 590 of the openings 569. Thereafter, continued movement of the back end of the fastener 510 into the aperture of the panel member 600 will initially cause the projections 518 to move in an inward direction and then back toward their original position when the fastener 510 is mounted, with the edges 590 then being positioned adjacent the locking surfaces 520. The mounted position of the fastener 510 within the panel 600 is illustrated in FIG. 30.

Similar to that described above, the fastener 510 after being mounted in the first panel member 600 can then be secured to the second panel member 602 at any desired time. For this purpose, the second panel member 602 is provided with a through hole 603 generally circular in configuration as is illustrated in FIGS. 29 and 30. Although not shown in the present embodiment, the panel members 600 and 602 are secured together by a bolt such as shown in FIGS. 5 and 8, received into the through holes 558 and 559 of the fastener 510 and then received into the aperture 603 through the second panel member 600, which is preferably threaded. Alternatively, a separate nut can be utilized and connected to the bolt extending through these portions. As discussed earlier, the relationship between the retaining member 514 and attachment member 512 creates frictional torque resistance or drag on the retaining member 514 as it is pivoted. Generally, the amount of resistance is regulated by the distance between the body 516 and the flange 532. In addition, preferably the amount of the frictional resistance is sufficiently high enough to hold the position of the retainer member 514 when adjusted into a desired position. In the present embodiment, preferably the frictional resistance is provided through 135° of rotation of the retaining member 514, although any other desired range can also be utilized where desired. In addition, in this embodiment, the relationship between the detent cams 566 on the retaining member 514 and the detent bumps 529 on the support 522 provides a detent for the retaining member 514 when positioned at approximately 0° as illustrated in FIG. 25 and at approximately 90° as illustrated in FIG. 26. However, as it should be understood, the cams 566 on the retaining member 514 and the detent bumps 529 on the support 522 can be provided at any desired location in order to accommodate a detent engagement at any desired rotational position. In addition, the numbers of detent bumps 529 can also be regulated to provide more or less detent positions. In the present embodiment, the channels 527 are provided in order to reduce wear on the detent cams 566 when the retaining member 514 is rotated. In addition, in the present embodiment, the tapered shoulders 572 on the retaining member 514 function to inhibit migration from side to side when assembled to the attachment member 512, which is due to the engagement of the tapered shoulders 572 and the opposing sides of the support 522.

Figure 31:
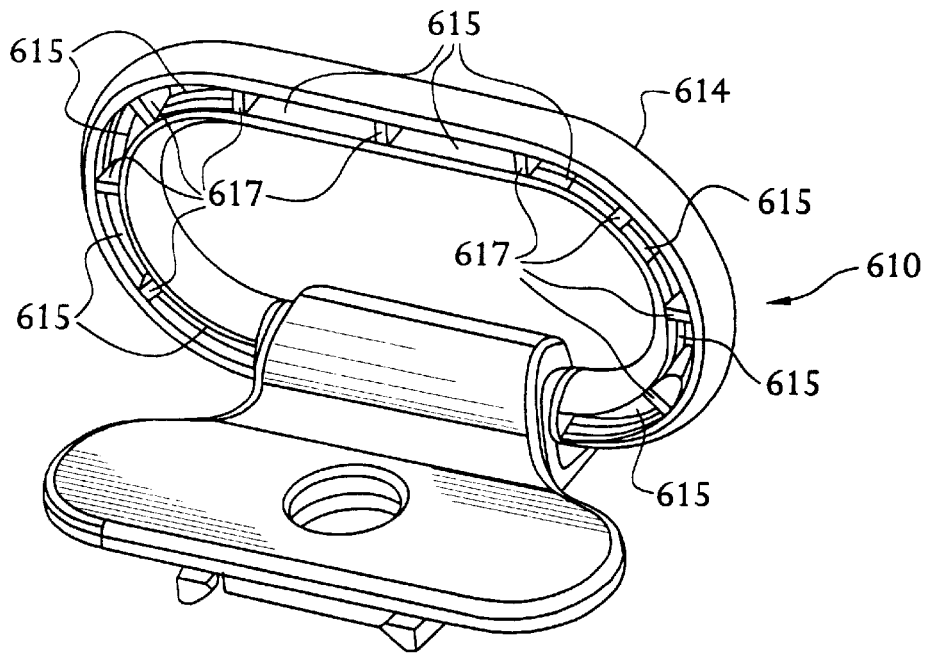
FIG. 31 is a perspective view of a fastener in accordance with another embodiment of the present invention.
Figure 32:
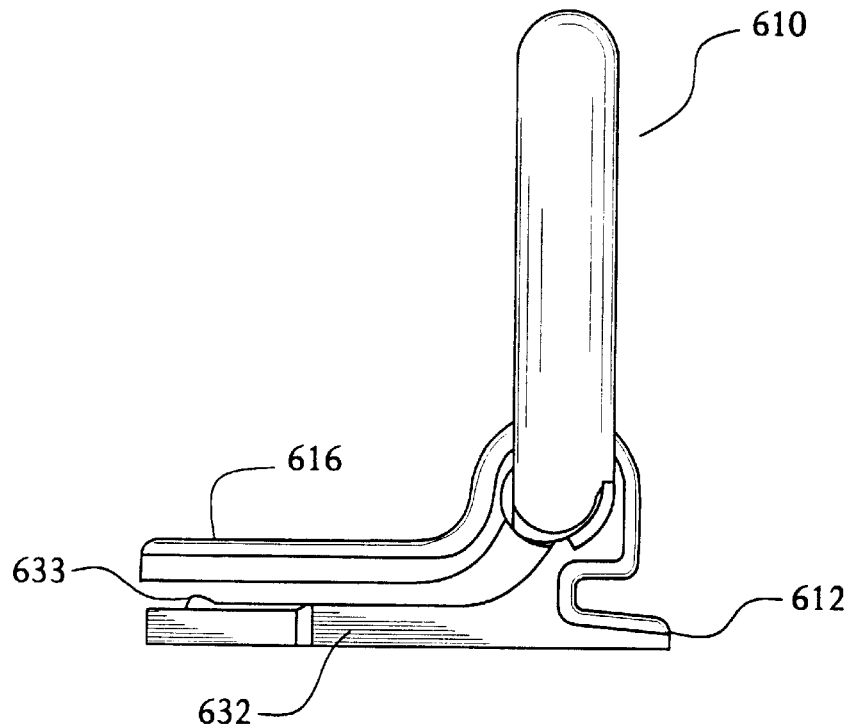
FIG. 32 is a right side elevational view of the fastener of FIG. 31.
Figure 33:
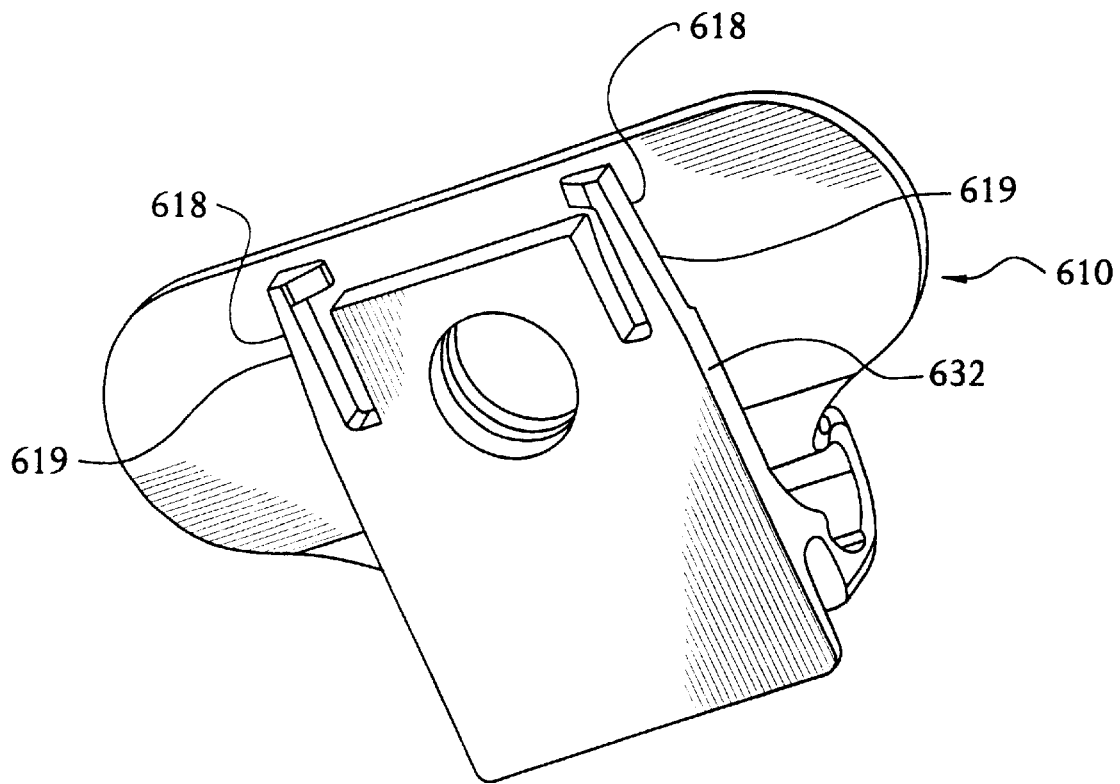
FIG. 33 is a bottom perspective view of an attachment member of FIG. 31.

In FIGS. 31–33 is illustrated another embodiment of a fastener in accordance with the present invention. The fastener 610 of the present embodiment is similar in many aspects to the fastener 510, and for the sake of brevity, only the portions of the fastener 610 that are different from the fastener 510 will be described herein.

As illustrated in FIG. 31, the retaining member 614 in the present embodiment includes at least one, and preferably a plurality of channels 615 in its underside surface separated by ribs 617. An advantage of this feature of the retaining member 614 is that it assists in manufacturing by reducing material and providing assembly orientation.

As illustrated in FIG. 33, the flange 632 in the present embodiment includes two projections 618 each having outer surfaces 619 that taper inwardly toward the direction of the terminating ends. An advantage is that the tapered outer surfaces 619 facilitate mounting into a panel, such as the panel 600 shown in FIG. 29. In addition, as illustrated in FIG. 32, the flange 632 of attachment member 612 also includes at least one boss comprising a boss 633 in the present embodiment, and which extends out from the upper surface of flange 632 and in the direction of the opposing body 616. One advantage of the boss 633 is that it prevents the two projections 618 from interfering with the bottom surface of the body 616 during installation. In addition, another benefit of boss 633 is that it alters the deflection point of the body 616 relative to flange 632 after a bolt, such as shown in FIGS. 5 and 8, has been applied, which results with additional pressure on retaining member 614 to increase the frictional torque resistance or drag.

In view of that set forth above, it should be understood that there are several advantages to the fastener of the present invention. One advantage is in the assembly of the device. For example, as illustrated with respect to the fasteners 10 and 200, the groove in the retaining member which is provided offset and the mating rib rail on the attachment member allow for one way installation. In addition, as illustrated in the fasteners 10, 200, 400, 510 and 610, the living spring connection of the support allows for the retaining member when comprising a solid hoop to snap into position, and also provides an encapsulation of the retaining member when mounted.

Another advantage of the present invention is in the ability to be installed into a first panel member prior to being mounted to a second panel member. This feature provides more versatility for the latch in that installation can take place at various stages. In addition, the unsymmetrical snap leg geometry of the projecting portions 30, 230 and projections 18 and 218a, respectively, insures proper assembly into the first panel member. In addition, the dual snap leg feature of the portion 30, 230 provided by two projections allows the attachment member to snap into both first and second panels, such as a plastic panel and sheet metal bracket. Further, the deflection lip 54 and deflection limiting edge 218b prevents the dual snap leg feature of the portion 30, 230 from being overstressed and broken during shipping and snap-in assembly. Further, the compressible flanged snap-in feature provided by the locking surfaces 49 and 81 on the support 22 and attachment member 12, respectively, and corresponding features on the fasteners 200 through 600, allow for assembly into the first panel member and insures that the assembly remains installed during transportation.

Another advantage in the present invention is its manner for attachment to the second panel member. For example, as indicated above, the portion 30, 230 accommodates a secondary snap-in feature and also provides additional holding force when the fastener is secured to the second panel member by the bolt. In addition, the position of the bolt through the flange also prevents pealing of the living spring during tensile loading.

Still additional advantages of the present invention are in operation of the device. Specifically, the drag feature can be used for any desired amount of rotation of the retaining member in the fasteners 10, 200, 400, 510 and 610, which is controlled by the compressible support. In addition, one or more detents at any desired position, which is at 90°, and 0° and 90° in the disclosed embodiments, is provided by the cams on the retaining member and controlled by a camming pivot axis which locates itself in the open area created by the compressible support. Further, the rib rail and groove feature between the retaining member and attachment member prevents the retaining member from migrating out of the support during rotation and/or side loading. Additionally, the secondary catch snap-in feature provided by the projection 39 of the portion 30 and corresponding portion of the fastener 200 prevents the support from pealing out of the second panel member during tensile loading. Furthermore, the recessed groove in the wall of the body of the attachment member allows a screwdriver or similar tool to compress the living spring connection of the support 22 for disassembly without damage to the fastener or panels.

Another advantage of the fastener of the present invention is that it is durable in use and of sufficient strength for a variety of applications, for example, the fasteners 510 and 610 in the illustrated embodiments can withstand an ultimate tensile force of 890 N (200 lbs) when a strap, such as elastic cord, is applied to the hoop.

The same advantages described above with respect to the fastener 10 are also present with the fastener members 200, 300, 400, 510 and 610 described above. Further, another advantage of the fastener 200 is that it is slightly easier to assemble into the first panel member, since there is no bottom flange 32 that is present with the fastener 10. In addition, with respect to the fastener 300, the assembly of the retaining member and attachment member is facilitated by the split hoop design for snap-in connection.

It will be recognized by those skilled in the art that changes may be made by the above-described embodiments of the invention without departing from the broad inventive concepts thereof. For example, each of the features described above do not all need to be included in a single device. Rather, one or more features can be provided in a single device where desired and in any combination. It is understood, therefore, that this invention is not limited to the particular embodiment disclosed, but it is intended to cover all modifications which are within the scope and spirit of the invention as defined by the appended claims.

We claim:

1. A fastener comprising:

a retaining member; and an attachment member connected to the retaining member, said attachment member having a body and a support attached to and moveable relative to said body, wherein said retaining member is positioned between said body and said support;

wherein said retaining member is connected to said attachment member for rotation and said fastener further comprises means between said attachment member and said retaining member for providing frictional resistance to rotation of said retaining member; and wherein said support comprises a substantially curved portion attached at one end thereof to said body and said retaining member is positioned within said substantially curved portion of said support, wherein said support further includes at least a second portion attached with said substantially curved portion and with said second portion being position adjacent to and moveable relative to said body for regulating said frictional resistance between said retaining member and said attachment member.

2. A fastener of claim 1, wherein said body and said second portion of said support include substantially aligned apertures therethrough adapted to receive a mounting bolt.

3. A fastener of claim 1 further including a boss between and adapted to engage said body and said support.

4. A fastener of claim 3, wherein said boss is attached to an upper surface of a flange of said support.

5. A fastener of claim 1, wherein said support and said body are of one-piece construction.

6. A fastener of claim 1, wherein said retaining member comprises a solid hoop.

7. A fastener of claim 6, wherein said retaining member includes at least one channel in an underside thereof.

8. A fastener of claim 6, wherein said retaining member comprises first, second and third portions, with said first portion of said retaining member being generally elongate and defining an outer surface of a specified diameter and connected to said second and third portions of said retaining member at opposite ends, wherein said second and third portions of said retaining member each define an outer surface of a larger diameter than said diameter of said first portion of said retaining member at least adjacent the connections thereof.

9. A fastener of claim 8, wherein said retaining member includes a taper between said first and second portions and between said first and third portions.

10. A fastener of claim 1, wherein said fastener further comprises means between said retaining member and said attachment member for holding said retaining member in at least one detent position when said retaining member is rotated.

11. A fastener according to claim 10 wherein said attachment member further comprises means for connecting said fastener to a panel.

12. A fastener of claim 11, wherein said connecting means comprises at least one projection extending from said second portion of said support, with said at least one projection defining a generally flexible member adapted to engage said panel.

13. A fastener of claim 12, wherein said connecting means comprises two projections extending from opposing sides of said second portion of said support and with each including a camming surface and a locking surface at terminating ends.

14. A fastener of claim 13, wherein each of said two projections include an outer surface having an inward taper in a direction of said terminating ends.

15. A fastener of claim 10, wherein said holding means comprises at least one detent on said retaining member engaging at least one detent on said support.

16. A fastener of claim 15, wherein said support further includes a cavity terminating by said detent thereof and said detent of said retaining member is positioned in said cavity of said support when said retaining member is rotated.

\* \* \* \* \*

UNITED STATES PATENT AND TRADEMARK OFFICE
CERTIFICATE OF CORRECTION

PATENT NO.  : 6,230,372 B1
DATED       : May 15, 2001
INVENTOR(S) : Sokurenko et al.

It is certified that error appears in the above-identified patent and that said Letters Patent is hereby corrected as shown below:

Column 14,
Line 20, delete 8 and replace with 6.
Line 42, delete 13 and replace with 12.
Line 48, delete 10 and replace with 1.

Signed and Sealed this

Twenty-first Day of May, 2002

Attest:

Attesting Officer

JAMES E. ROGAN
Director of the United States Patent and Trademark Office